US011938531B2

(12) United States Patent
Goto

(10) Patent No.: US 11,938,531 B2
(45) Date of Patent: Mar. 26, 2024

(54) PRESS BRAKE

(71) Applicant: AMADA CO., LTD., Kanagawa (JP)

(72) Inventor: Shintaro Goto, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 411 days.

(21) Appl. No.: 17/602,751

(22) PCT Filed: Apr. 14, 2020

(86) PCT No.: PCT/JP2020/016365
§ 371 (c)(1),
(2) Date: Oct. 9, 2021

(87) PCT Pub. No.: WO2020/213584
PCT Pub. Date: Oct. 22, 2020

(65) Prior Publication Data

US 2022/0161304 A1 May 26, 2022

(30) Foreign Application Priority Data

Apr. 17, 2019 (JP) ................................ 2019-078268

(51) Int. Cl.
*B21D 5/02* (2006.01)
*G05G 1/40* (2008.04)

(52) U.S. Cl.
CPC ................ *B21D 5/02* (2013.01); *G05G 1/40* (2013.01)

(58) Field of Classification Search
CPC ........... B21D 5/02; B30B 15/00; G05G 1/40; G05G 1/42; G05G 1/405
See application file for complete search history.

(56) References Cited

U.S. PATENT DOCUMENTS 5,586,465 A 12/1996 Alcini
9,296,029 B2 * 3/2016 Sperrer ................. G05B 19/19
2009/0024246 A1 1/2009 Ikeda

FOREIGN PATENT DOCUMENTS

CN 202071373 U * 12/2011 ............ B30B 1/326
JP 2004-261844 A 9/2004
JP 2005-319515 A 11/2005
(Continued)

OTHER PUBLICATIONS

International Search Report for corresponding Application No. PCT/JP2020/016365, dated Jul. 14, 2020.
(Continued)

*Primary Examiner* — Daniel D Yabut
(74) *Attorney, Agent, or Firm* — Renner, Otto, Boisselle & Sklar, LLP

(57) ABSTRACT

A press brake includes a pedal case having an upper portion coupled to a sliding member, which is provided on a lower table and movable in a longitudinal direction, so as to be movable and tiltable in a vertical direction, the pedal case extending on its back surface side toward the lower table relative to the sliding member, the pedal case having a grounding portion capable of being grounded on a floor surface, a rolling body provided on each of side surfaces of the pedal case in the longitudinal direction and configured to roll on the floor surface along the longitudinal direction, and an urging member configured to urge the pedal case with respect to the sliding member so that the grounding portion is separated from the floor surface.

6 Claims, 8 Drawing Sheets

(56) References Cited

FOREIGN PATENT DOCUMENTS

| | | | | | |
|---|---|---|---|---|---|
| JP | 2016068143 | A | * | 5/2016 | |
| JP | 2016-215230 | A | | 12/2016 | |
| JP | 2017-124433 | A | | 7/2017 | |
| JP | 6450820 | B1 | | 1/2019 | |
| WO | WO-2005097370 | A1 | * | 10/2005 | ............... B21D 5/02 |
| WO | WO-2012079109 | A1 | * | 6/2012 | ............... B21D 5/00 |

OTHER PUBLICATIONS

Written Opinion for corresponding Application No. PCT/JP2020/016365, dated Jul. 14, 2020.

* cited by examiner

PRESS BRAKE

TECHNICAL FIELD

The present invention relates to a press brake that performs bending of a plate-shaped workpiece by collaboration of an upper tool and a lower tool.

BACKGROUND ART

Step bend processing has been known in which bending processes are sequentially performed based on a bending order of a workpiece at a plurality of processing stations formed between an upper table and a lower table in a press brake. Patent Literature 1 describes a movable foot switch device that allows a pedal case to be moved manually (by human power) in a longitudinal direction (a longitudinal direction of the press brake) with suppressed complexity of a configuration of the press brake.

The configuration described in Patent Literature 1 will be briefly described. A guide member extending in a longitudinal direction is provided at a lower portion of a lower table. A sliding member is provided on the guide member so as to be movable in the longitudinal direction. A pedal case has, on its back side, a lower portion coupled to a lower portion of the sliding member via a plurality of hinges so as to be tiltable in a vertical direction. The pedal case is moved manually in the longitudinal direction together with the sliding member. The pedal case has, at a lower end on its front side, a grounding portion capable of being grounded on a floor surface. A foot pedal that is stepped on to perform an elevating and lowering operation of an upper table is provided inside the pedal case.

On each of side surfaces of the pedal case in the longitudinal direction, a rolling roller as a rolling body configured to roll on the floor surface along the longitudinal direction is provided so as to be rotatable and movable in the vertical direction. Further, on each of the side surfaces of the pedal case in the longitudinal direction, a cover is provided for covering the rolling roller from above. A spring is provided inside each cover for urging the rolling roller downward with respect to the pedal case. The foot switch device is configured such that when the foot pedal is stepped on, each rolling roller is moved upward relative to the pedal case while resisting an urging force of the spring, so that the grounding portion of the pedal case is grounded on the floor surface. This makes it possible to prevent a position of the pedal case from being displaced in the longitudinal direction, which is caused by the stepping operation on the foot pedal. As a result, an operator can perform bending (processing operation) without losing a balance when stepping on the foot pedal.

CITATION LIST

Patent Literature

Patent Literature 1: Japanese Patent No. 6450820

SUMMARY

Since the lower portion on the back side of the pedal case is coupled to the lower portion of the sliding member so as to be tiltable in the vertical direction, the entire pedal case is located on the front side (forward side) relative to the sliding member. Therefore, it is not possible to bring the foot pedal and the foot switch sufficiently close to the lower table.

For this reason, an operator performs bending while being away from the lower table and the lower tool, which may result in a decrease in workability of the bending.

Further, as described above, in order to prevent the position of the pedal case from being displaced in the longitudinal direction, which is caused by the stepping operation on the foot pedal, it is necessary to provide a cover on each of side surfaces of the pedal case in the longitudinal direction and to provide a spring inside each cover. For this reason, when a foot that does not step on the foot pedal is attempted to be placed on a side of the pedal case in the longitudinal direction, the cover and the like become an obstacle and limit a space where the foot that does not step on the foot pedal is to be placed. As a result, the operator cannot perform bending for a long time while maintaining a stable posture, which may result in a further decrease in workability of the bending.

In other words, there is a problem of being difficult to sufficiently improve the workability of bending while the operator is maintaining a balance when stepping on the foot pedal.

The present invention is intended to provide a press brake in which a pedal case can be brought sufficiently close to a lower table, and a space where a foot that does not step on a foot pedal is to be placed can be sufficiently secured on both sides of the pedal case in a longitudinal direction.

The press brake according to an embodiment of the present invention includes a guide member provided at a lower portion of a lower table or provided on a separate member arranged on a front side of the lower table, the guide member extending in a longitudinal direction, a sliding member provided on the guide member so as to be movable in the longitudinal direction, a pedal case having an upper portion coupled to the sliding member so as to be movable and tiltable in a vertical direction, the pedal case extending on a back surface side thereof toward the lower table relative to the sliding member, the pedal case having a grounding portion capable of being grounded on a floor surface, the pedal case being manually movable in the longitudinal direction together with the sliding member, a foot pedal provided inside the pedal case and configured to be stepped on to perform an elevating and lowering operation of an upper table, a rolling body provided on each of side surfaces of the pedal case in the longitudinal direction and configured to roll on the floor surface along the longitudinal direction, and an urging member configured to urge the pedal case with respect to the sliding member so that the grounding portion of the pedal case is separated from the floor surface.

According to the above configuration, since the pedal case can be brought sufficiently close to the lower table, an operator can perform bending while being sufficiently close to the lower table and a lower tool. Further, since it is possible to sufficiently secure a space where a foot that does not step on the foot pedal is to be placed on both sides of the pedal case in the longitudinal direction, the operator can perform bending for a long time while maintaining a stable posture. In other words, according to the present invention, the workability of the bending can be sufficiently improved while the operator is maintaining a balance when stepping on the foot pedal.

BRIEF DESCRIPTION OF DRAWINGS

FIG. 8A is a cross-sectional view taken along the line V-V in FIG. 4 in a state where a lowering foot pedal or an elevating foot pedal is not stepped on.

FIG. 8B is a cross-sectional view taken along the line V-V in FIG. 4 in a state where the lowering foot pedal or the elevating foot pedal is stepped on.

DESCRIPTION OF EMBODIMENT

Figure 1:
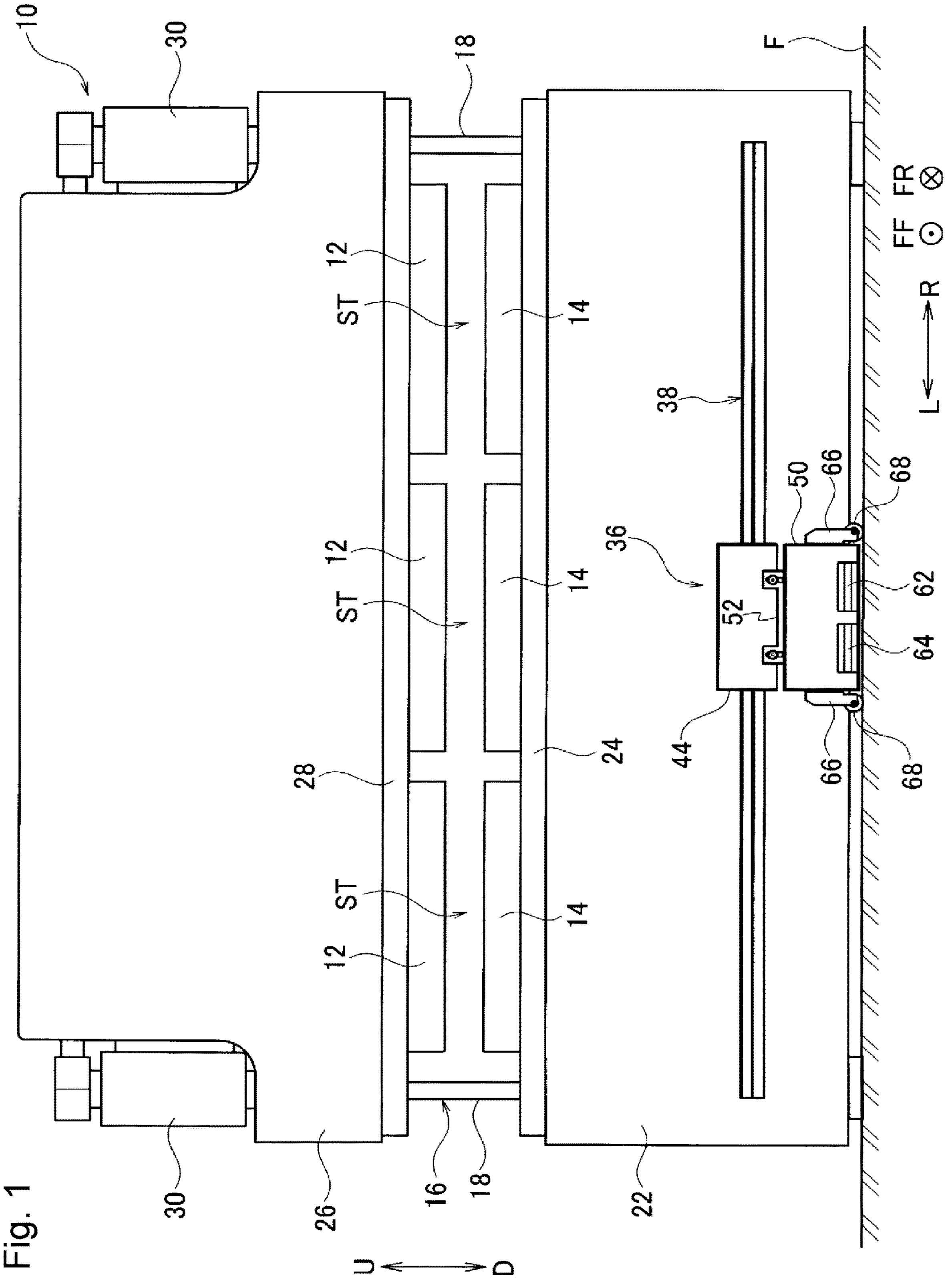
FIG. 1 is a schematic front view of a press brake according to an embodiment of the present invention.

Hereinafter, embodiments of the present invention will be described with reference to FIGS. 1 to 8B.

Note that the "longitudinal direction" refers to a longitudinal direction of a press brake 10, and is a left-right direction in the present embodiment. The "depth direction" refers to a depth direction of the press brake 10, and is a front-rear direction in the present embodiment. In the drawings, "FF" indicates a forward direction, "FR" indicates a backward direction, "L" indicates a left direction, "R" indicates a right direction, indicates an upward direction, and "D" indicates a downward direction.

Figure 2:
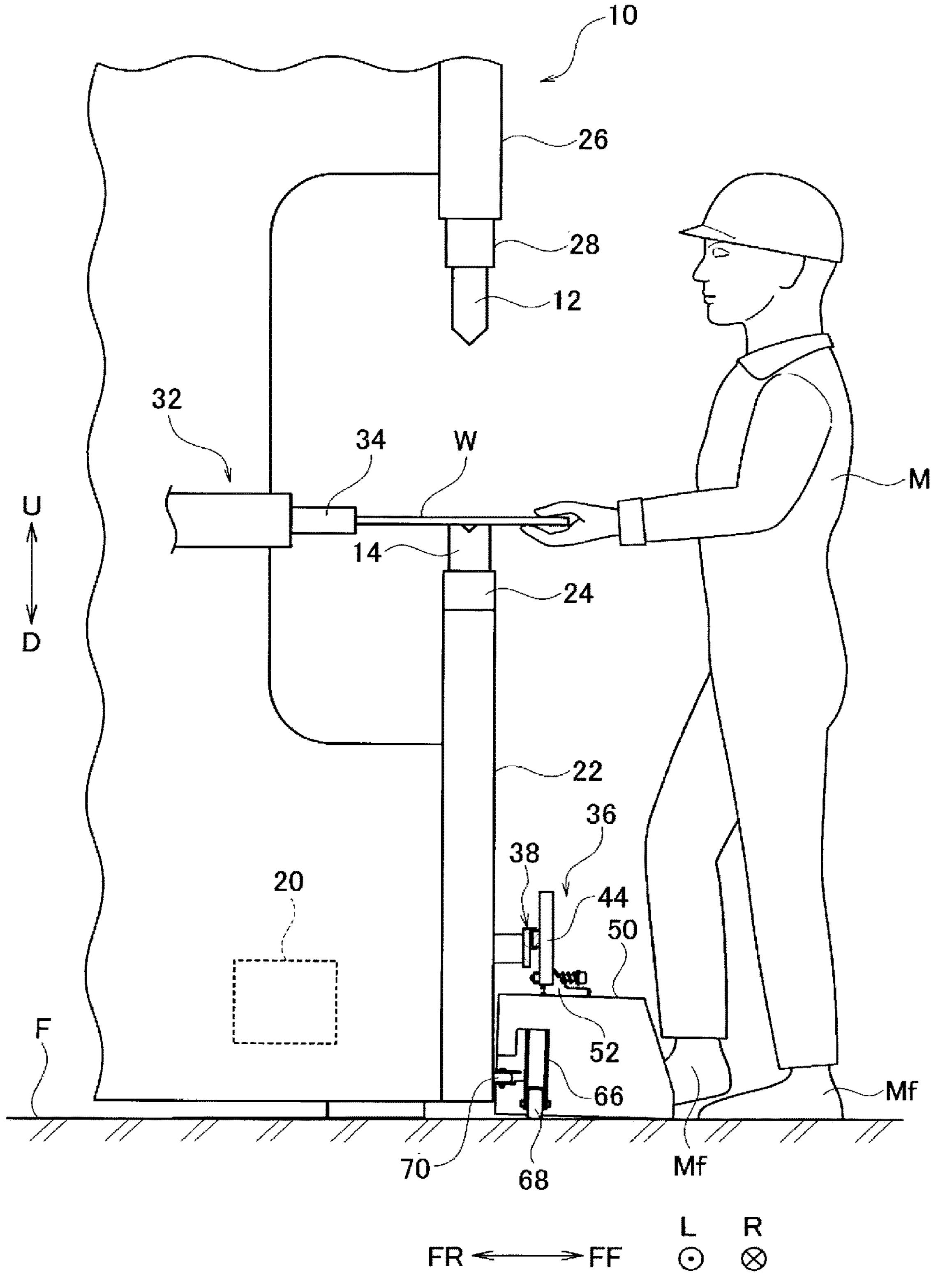
FIG. 2 is a schematic partial side view of the press brake according to the embodiment of the present invention.
Figure 3:
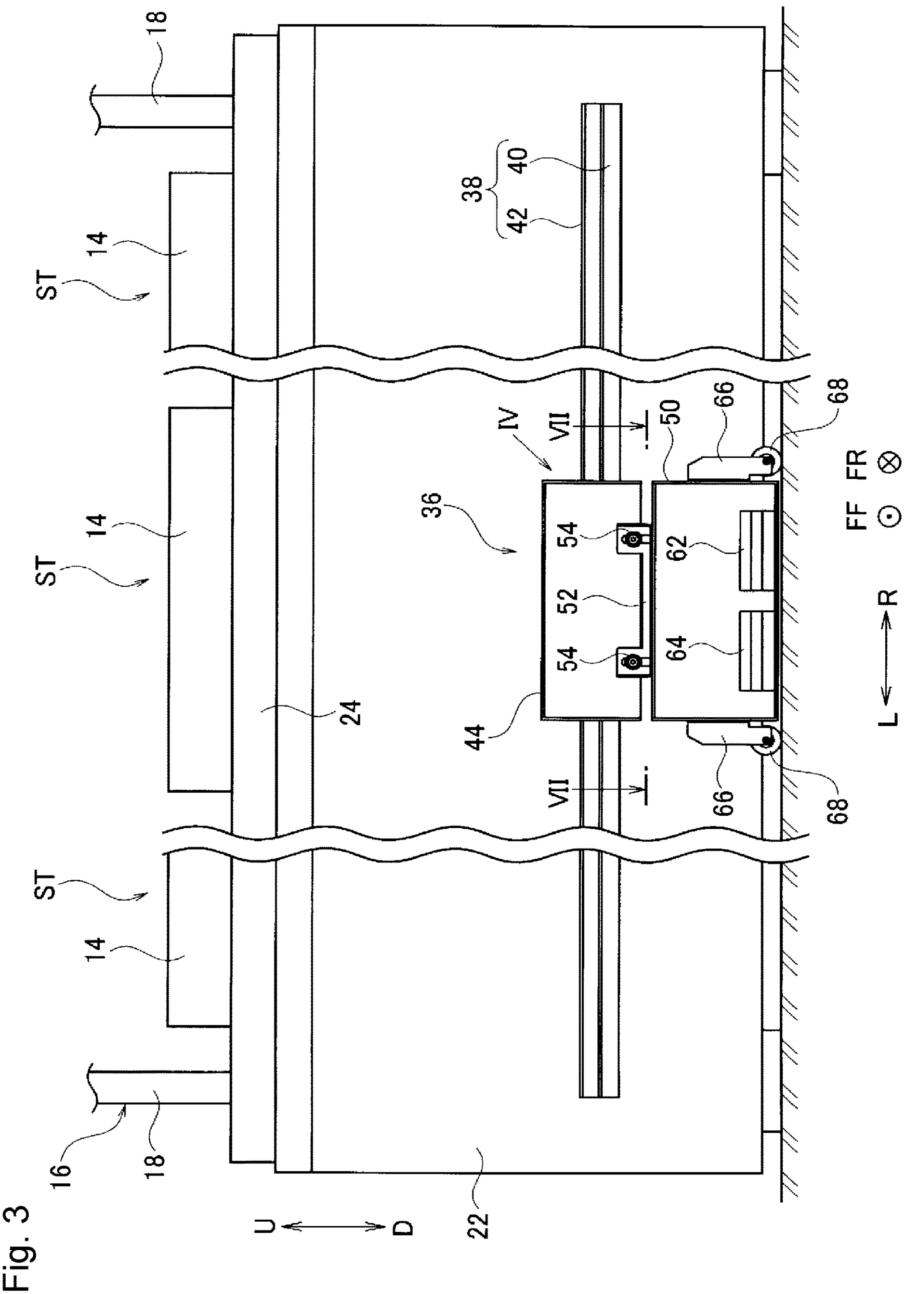
FIG. 3 is a schematic partially enlarged front view of the press brake according to the embodiment of the present invention.

As shown in FIGS. 1 to 3, the press brake 10 according to the present embodiment is a machining device that performs bending of a plate-shaped workpiece (sheet metal) W by collaboration of a punch 12 as an upper tool and a die 14 as a lower tool. The press brake 10 has a main body frame 16. The main body frame 16 has a pair of side plates 18 separated from and opposed to each other in the longitudinal direction (the left-right direction), and a plurality of coupling members 20 (only one of which is shown) for coupling the pair of side plates 18.

A lower table 22 extending in the longitudinal direction is provided at a lower portion of the main body frame 16. A lower tool holder 24 for holding the die 14 is provided on an upper side of the lower table 22. The die 14 is attachable and detachable to/from the lower tool holder 24. An upper table 26 that extends in the longitudinal direction and can be elevated and lowered (moved in the vertical direction) is provided at an upper portion of the main body frame 16. An upper tool holder 28 for holding the punch 12 is provided on a lower side of the upper table 26. The punch 12 is attachable and detachable to/from the upper tool holder 28. A hydraulic cylinder 30 is provided at an upper portion of each side plate 18 as an elevating and lowering means for elevating and lowering the upper table 26. Note that an electric motor (not shown) may be used as the elevating and lowering means instead of the hydraulic cylinder 30.

Here, a plurality of the dies 14 are arranged in the lower tool holder 24 at intervals in the longitudinal direction, and a plurality of the punches 12 are arranged in the upper tool holder 28 at intervals in the longitudinal direction. This results in a formation of a plurality of processing stations ST for performing step bend processing between the upper table 26 and the lower table 22.

A back gauge device 32 for positioning the workpiece W in the depth direction (front-rear direction) with respect to the die 14 is provided on the back side (rear side) of the lower table 22. The back gauge device 32 has an abutting member 34 against which an end surface of the workpiece W can be abutted. The position of the abutting member 34 can be adjusted in the depth direction.

The press brake 10 includes a mobile foot switch device 36 for performing an elevating and lowering operation of the upper table 26 by a stepping operation of an operator M. The specific configuration of the foot switch device 36 will be described below.

As shown in FIGS. 3 to 6, a guide member 38 extending in the longitudinal direction is provided directly at the lower portion of the lower table 22. The guide member 38 has a bracket 39 provided (fixed) at the lower portion of the lower table 22, a guide main body 40 provided (fixed) on a front surface (forward surface) of the bracket 39, and a guide rail 42 provided (fixed) on a front surface (forward surface) of the guide main body 40 and formed in a U shape with the front side thereof being open. Note that the bracket 39 may be omitted, and the guide member 38 may be configured with the guide main body 40 and the guide rail 42 with the guide main body 40 fixed at the lower portion of the lower table 22. Further, the guide main body 40 may be fixed at the lower portion of the lower table 22 by using an appropriate member other than the bracket 39. Further, instead of providing the guide member 38 directly at the lower portion of the lower table 22, the guide member 38 may be provided (fixed) on a separate member (not shown) such as a fixed frame arranged on the front side of the lower table 22.

A sliding member 44 is provided on the guide member 38 so as to be movable in the longitudinal direction. The sliding member 44 has a slide rail 46 that is guided by the guide rail 42 of the guide member 38 so as to be movable in the longitudinal direction, and a slide main body 48 provided on the slide rail 46.

An upper portion (upper surface) 50*u* of the pedal case 50 is coupled to the slide main body 48 (for example, a lower end portion of the slide main body 48) so as to be movable and tiltable (swingable) in the vertical direction. A foot Mf can be inserted into the pedal case 50 from the front side thereof. The pedal case 50 extends on its back surface 50*b* side toward the lower table 22 (rear direction) relative to the sliding member 44, and a back surface 50*b* of the pedal case 50 is close to the lower table 22. The pedal case 50 has a grounding portion 50*e* capable of being grounded on a floor surface F at a lower end on the front side thereof.

A coupling bracket 52 is provided at the upper portion 50*u* of the pedal case 50 as a configuration for coupling the upper portion 50*u* of the pedal case 50 to the slide main body 48 (for example, the lower end portion of the slide main body 48). A pair of elongated holes 52*h* extending in the vertical direction are formed on the coupling bracket 52. The pair of elongated holes 52*h* are separated in the longitudinal direction. Fixing bolts 54 as a pair of fixing members are fixed via nuts 56 to the slide main body 48 (for example, a lower portion of the slide main body 48). The pair of fixing bolts 54 are separated in the longitudinal direction. Each fixing bolt 54 is inserted through the corresponding elongated hole 52*h* of the coupling bracket 52. Note that the number of the elongated holes 52*h*, and the number of the fixing bolts 54 and the nuts 56 are not limited to the above, and may be appropriate numbers.

A compression spring 58 is provided on an outer circumference of each fixing bolt 54 via a plurality of washers 60. Each compression spring 58 is an urging member for urging the coupling bracket 52 toward the sliding member 44 (rear direction). Each compression spring 58 urges the coupling bracket 52 toward the sliding member 44, thereby urging the pedal case 50 with respect to the sliding member 44 so that the grounding portion 50*e* of the pedal case 50 is separated from the floor surface F. Note that instead of using the compression spring 58 as the urging member, a spring (not shown) other than the compression spring 58 or an elastic member (not shown) such as a rubber member may be used. The location where the urging member (the compression spring 58 or the like) is arranged is not limited to the outer circumference of the fixing bolt 54, and may be changed to an appropriate position of the pedal case 50.

Figure 4:
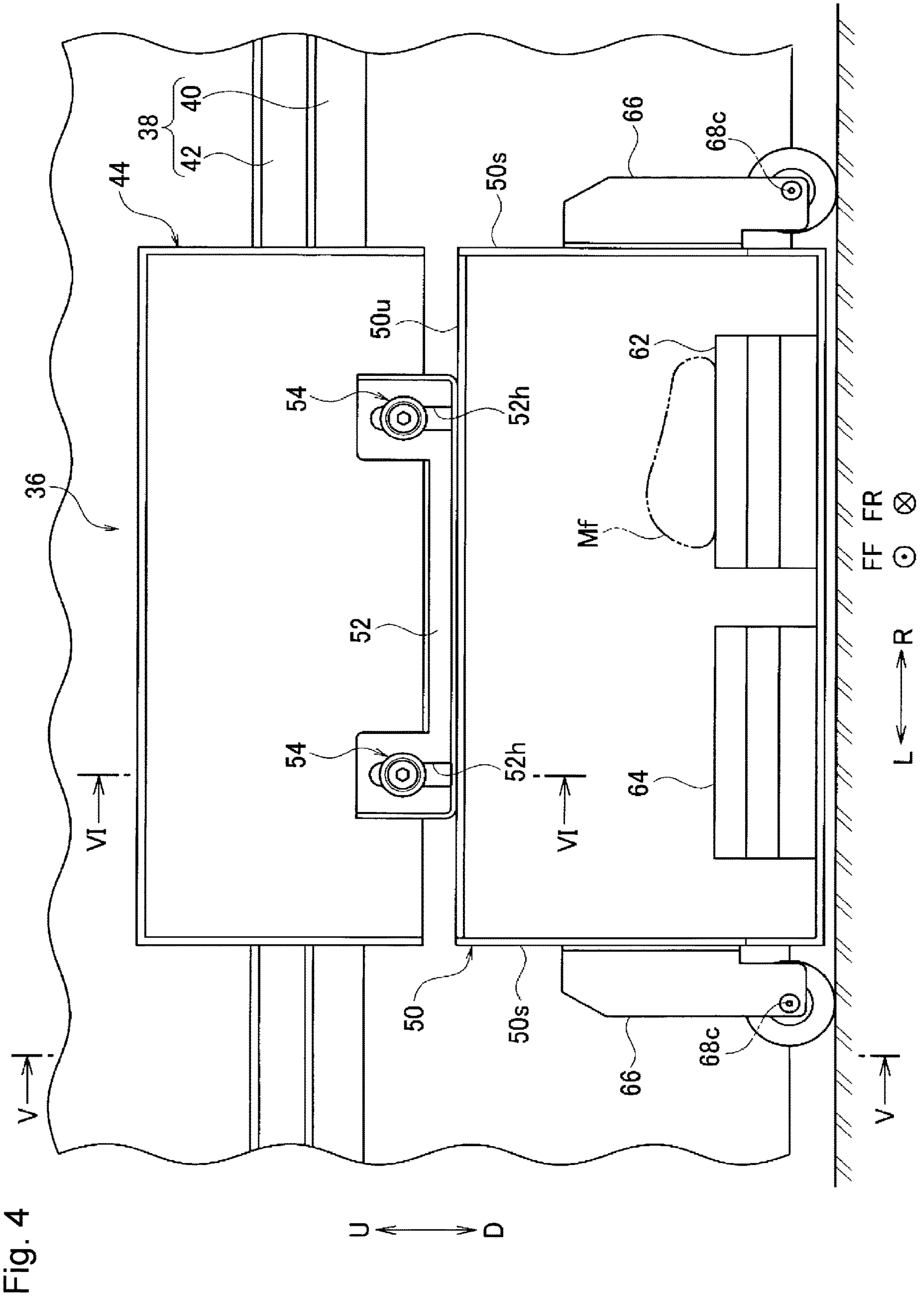
FIG. 4 is an enlarged view of an IV portion in FIG. 3.
Figure 5:
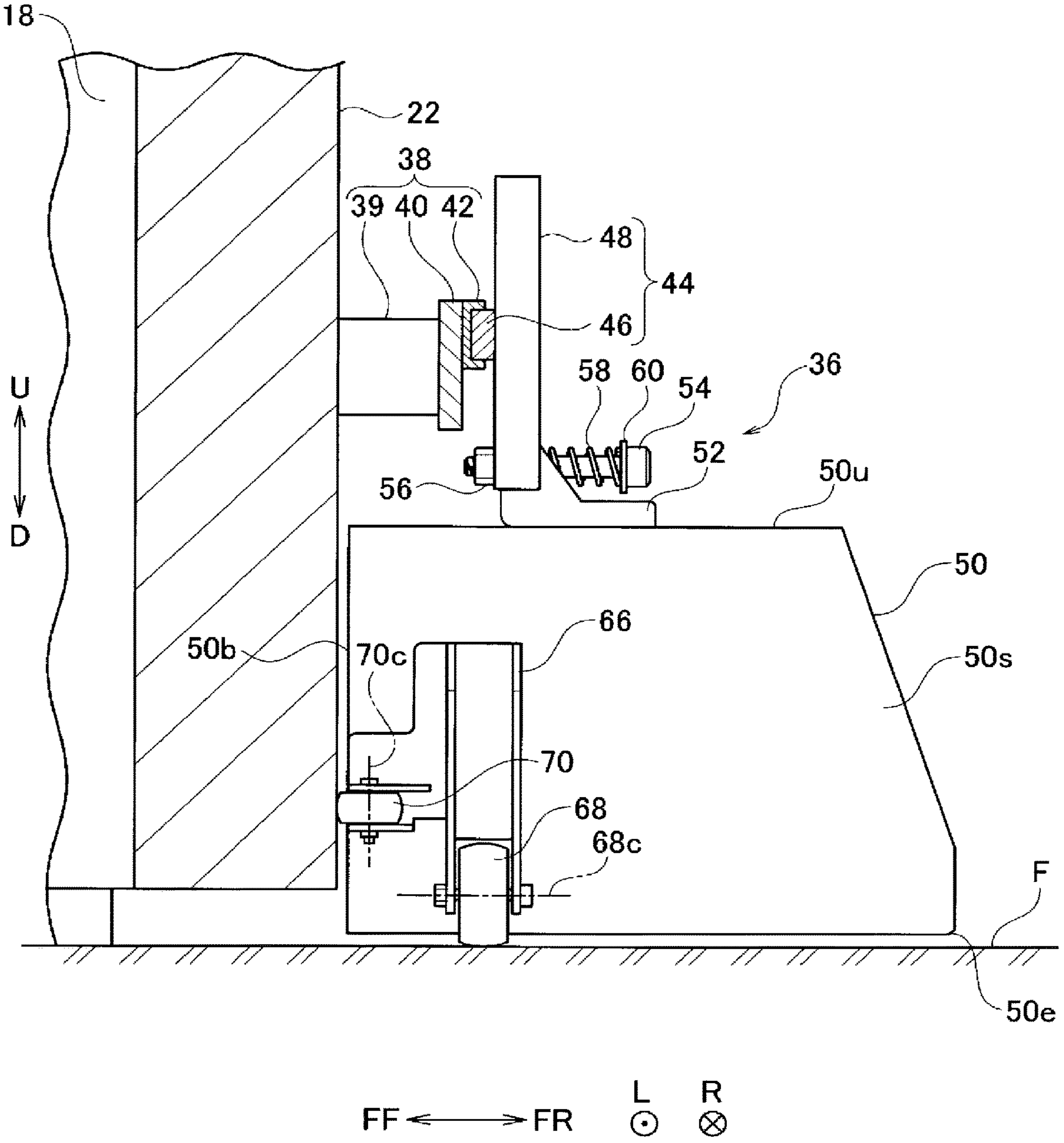
FIG. 5 is a cross-sectional view taken along a line V-V in FIG. 4.
Figure 6:
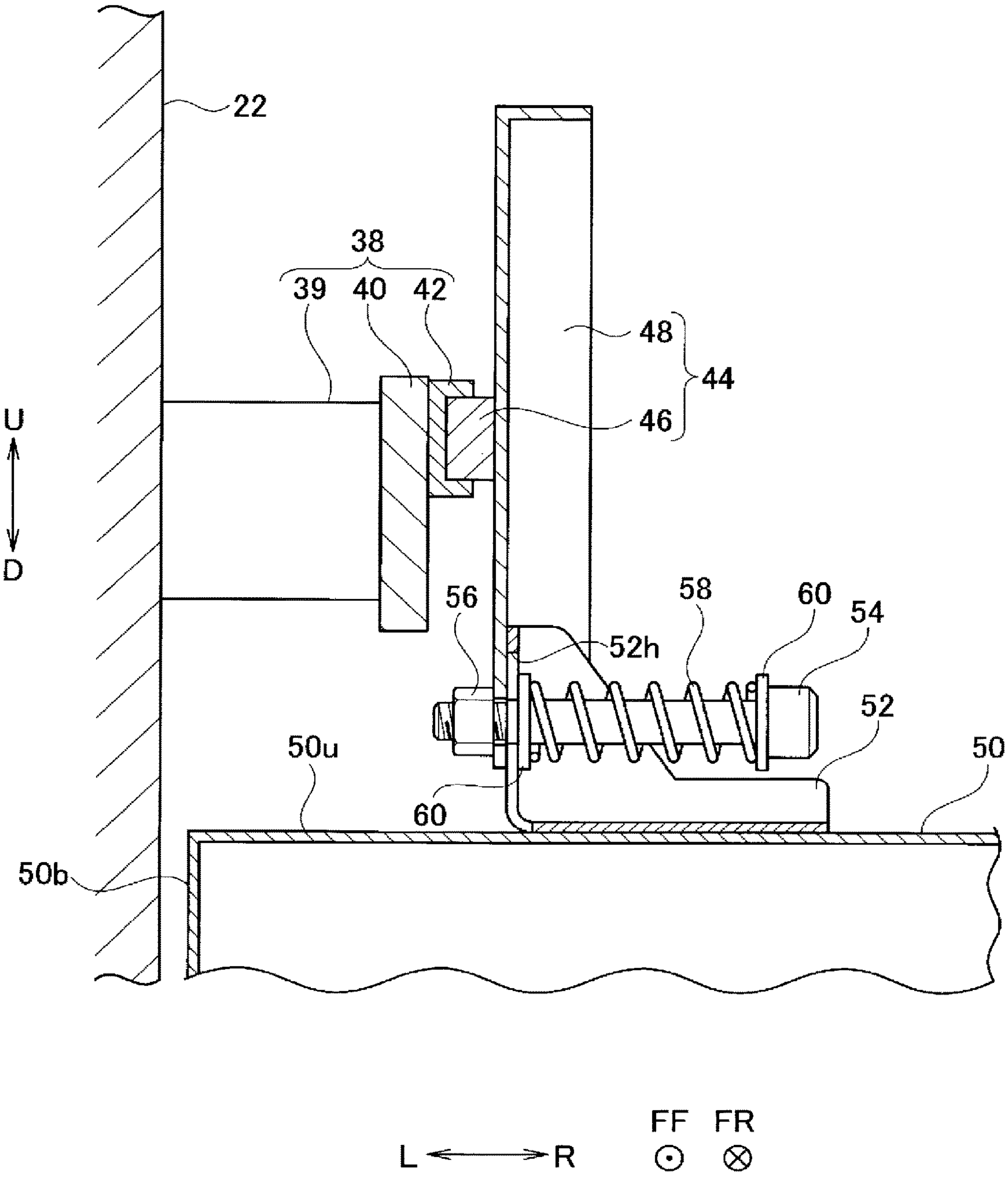
FIG. 6 is an enlarged cross-sectional view taken along a line VI-VI in FIG. 4.
Figure 7:
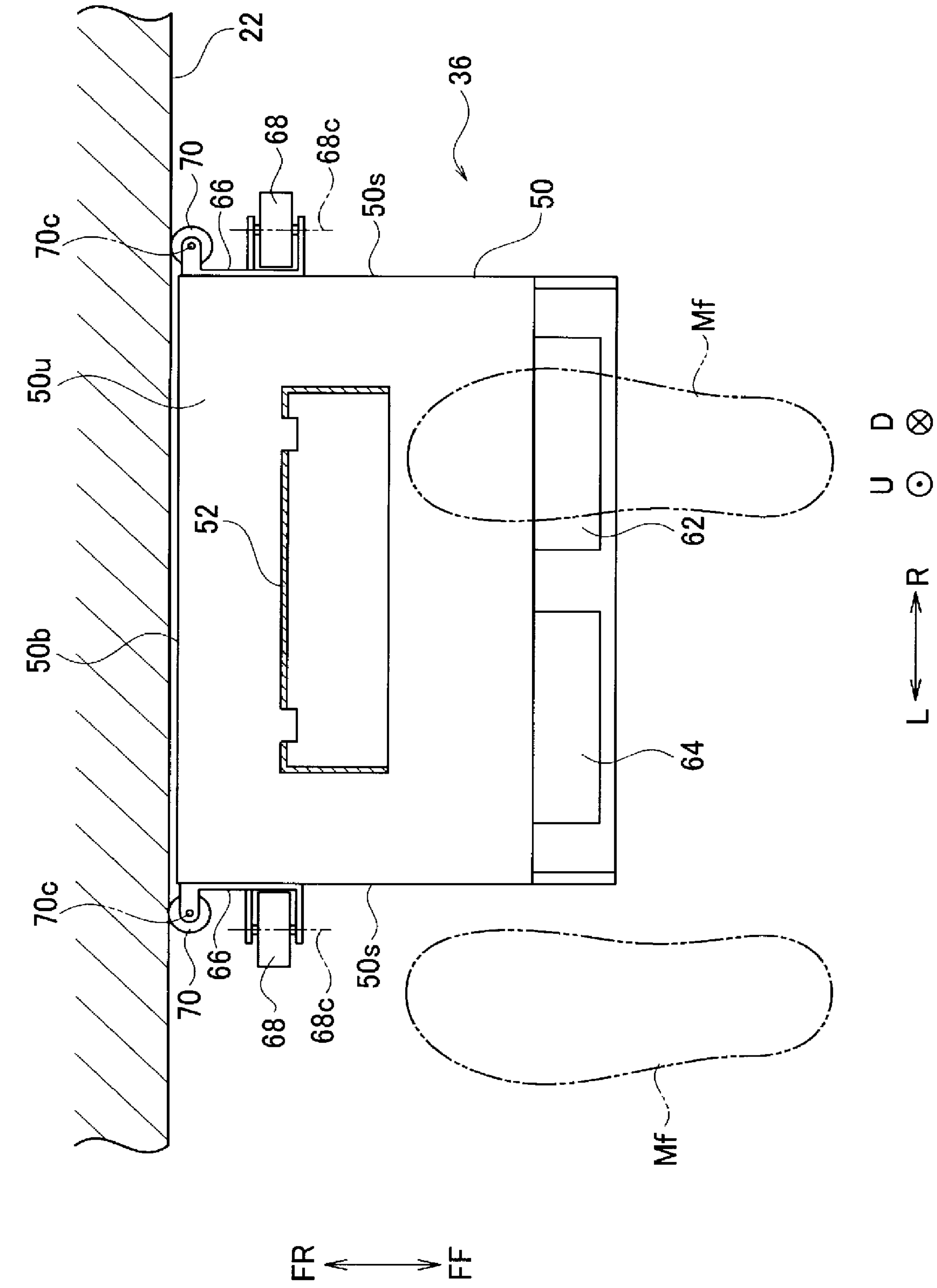
FIG. 7 is an enlarged cross-sectional view taken along a line VII-VII in FIG. 3.

As shown in FIGS. 3, 4, and 7, a lowering foot pedal 62 and an elevating foot pedal 64 that are stepped on to perform the elevating and lowering operation of the upper table 26 is provided inside the pedal case 50. A stepping operation on the lowering foot pedal 62 controls each hydraulic cylinder 30 so as to perform a lowering operation of the upper table 26. A stepping operation on the elevating foot pedal 64 controls each hydraulic cylinder 30 so as to perform an elevating operation of the upper table 26. Note that the elevating operation of the upper table 26 may be automatically performed when the upper table 26 reaches a bottom dead center.

A support bracket 66 is provided on each of side surfaces 50*s* of the pedal case 50 in the longitudinal direction. At a lower portion of each support bracket 66, a rolling roller (caster) 68 is rotatably provided around a horizontal axial center 68*c*. Each rolling roller 68 is a rolling body configured to roll on the floor surface F along the longitudinal direction. In other words, on each of the side surfaces 50*s* of the pedal case 50 in the longitudinal direction, the rolling roller 68 is rotatably provided around the horizontal axial center 68*c* via the support bracket 66. Each rolling roller 68 is located closer to the lower table 22 (rear side) than the center position of the pedal case 50 in the depth direction. The center position of the pedal case 50 in the depth direction is a position the half way of the whole length of the pedal case 50 in the depth direction. Note that instead of using the rolling roller 68 as the rolling body, a free bearing (not shown), a ball plunger (not shown), or the like may be used.

At a rear portion of each support bracket 66, an auxiliary rolling roller (auxiliary caster) 70 is rotatably provided around a vertical axial center 70*c*. Each auxiliary rolling roller 70 is an auxiliary rolling body configured to roll on a lower portion of the front surface of the lower table 22 along the longitudinal direction. In other words, on each of the side surfaces 50*s* of the pedal case 50 in the longitudinal direction, the auxiliary rolling roller 70 is rotatably provided around the vertical axial center 70*c* via the support bracket 66. Each auxiliary rolling roller 70 projects toward the lower table 22 relative to the back surface 50*b* of the pedal case 50. Note that instead of using the auxiliary rolling roller 70 as the auxiliary rolling body, an auxiliary free bearing (not shown), an auxiliary ball plunger (not shown), or the like may be used.

Figure 8A:
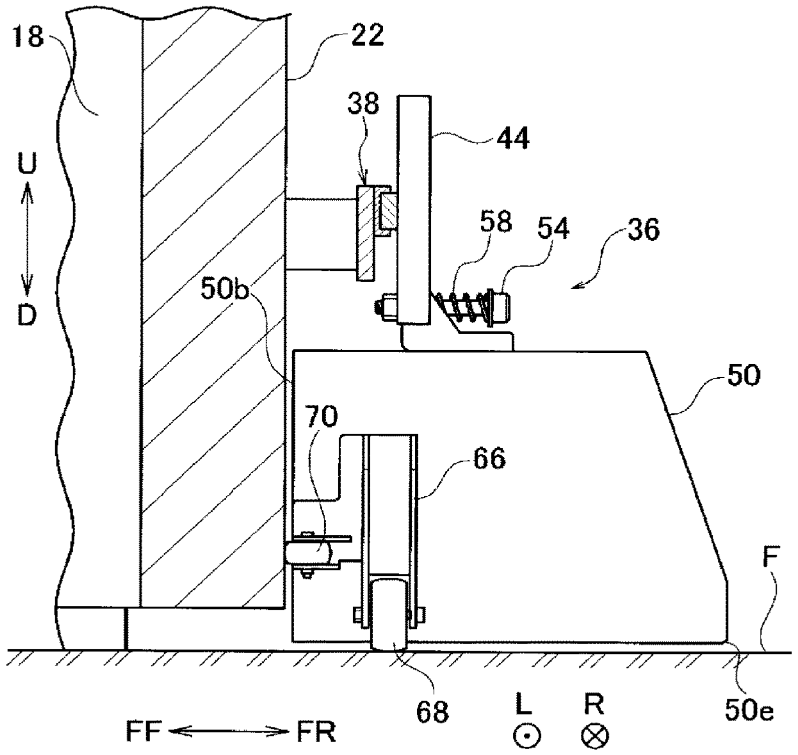
Figure 8B:
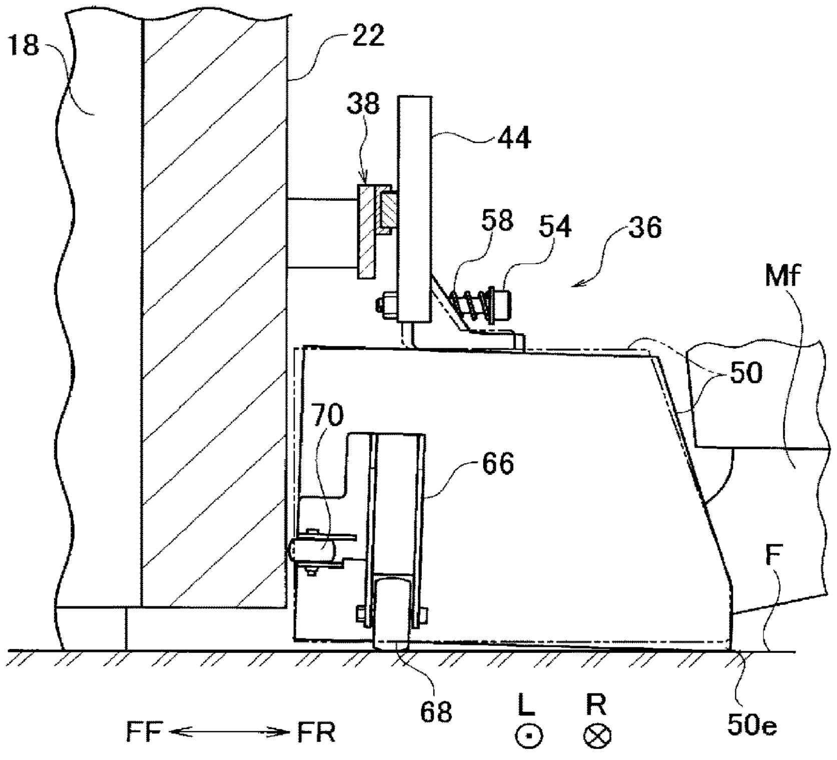

As shown in FIGS. 7, 8A and 8B, the foot switch device 36 (press brake 10) is configured such that when the lowering foot pedal 62 or the elevating foot pedal 64 is stepped on, the pedal case 50 is tilted downward with each rolling roller 68 as a fulcrum while resisting an urging force of each compression spring 58, so that the grounding portion 50*e* of the pedal case 50 is grounded on the floor surface F. Each auxiliary rolling roller 70 is configured to be separated from the front surface of the lower table 22 when the grounding portion 50*e* of the pedal case 50 is grounded on the floor surface F.

Next, the operation of the press brake 10 will be described.

When step bending is performed in the plurality of processing stations ST, first, the pedal case 50 is moved in the longitudinal direction together with the sliding member 44 manually (by human power) such as by pushing with the foot Mf of the operator M, so that the pedal case 50 is placed at a position corresponding to a first processing station ST. Next, in the first processing station ST, the end surface of the workpiece W is abutted against the abutting member 34 so that the workpiece W is positioned in the depth direction with respect to the die 14. Then, the stepping operation on the lowering foot pedal 62 and the elevating foot pedal 64 (or only the lowering foot pedal 62) controls each hydraulic cylinder 30 so as to perform the elevating and lowering operation of the upper table 26. Thereby, in the first processing station ST, a first bending is performed to the workpiece W by collaboration with the punch 12 and the die 14.

After that, the pedal case 50 is moved in the longitudinal direction together with the sliding member 44 manually based on a bending order of the workpiece W, so that the pedal case 50 is placed at a position corresponding to a subsequent processing station ST. Next, in the subsequent processing station ST, the end surface of the workpiece W is abutted against the abutting member 34 so that the workpiece W is positioned in the depth direction with respect to the die 14. Then, the stepping operation on the lowering foot pedal 62 and the elevating foot pedal 64 (or only the lowering foot pedal 62) controls each hydraulic cylinder 30 so as to perform the elevating and lowering operation of the upper table 26. Thereby, in the subsequent processing station ST, a subsequent bending is performed to the workpiece W by collaboration with the punch 12 and the die 14.

As described above, the upper portion 50*u* of the pedal case 50 is coupled to the sliding member 44 via the coupling bracket 52 and the pair of fixing bolts 54 so as to be tiltable in the vertical direction. The pedal case 50 extends on its back surface 50*b* side toward the lower table 22 relative to the sliding member 44. For this reason, the pedal case 50, the lowering foot pedal 62, and the elevating foot pedal 64 can be brought sufficiently close to the lower table 22.

The auxiliary rolling rollers 70 are rotatably provided on each of the side surfaces 50*s* of the pedal case 50 in the longitudinal direction via the support bracket 66. For this reason, the pedal case 50 and the like can be brought close to the lower table 22 more sufficiently while avoiding interference (contact) between the pedal case 50 and the lower table 22.

As described above, the upper portion 50*u* of the pedal case 50 is coupled to the sliding member 44 (for example, a lower end portion of the sliding member 44) via the coupling bracket 52 and the pair of fixing bolts 54 so as to be movable in the vertical direction. The compression spring 58 provided on the outer circumference of each fixing bolt 54 urges the pedal case 50 with respect to the sliding member 44 so that the grounding portion 50*e* of the pedal case 50 is separated from the floor surface F. The foot switch device 36 is configured such that when the lowering foot pedal 62 or the elevating foot pedal 64 is stepped on, the pedal case 50 is tilted downward with each rolling roller 68 as a fulcrum while resisting the urging force of each compression spring 58, so that the grounding portion 50*e* of the pedal case 50 is grounded on the floor surface F. For this reason, without providing a cover for covering the rolling roller 68 from above on each of the side surfaces 50*s* of the pedal case 50 in the longitudinal direction, and providing a spring inside each cover for urging the rolling roller 68 downward with respect to the pedal case 50, it is possible to prevent the position of the pedal case 50 from being displaced in the longitudinal direction, which is caused by the stepping operation on the lowering foot pedal 62 or the elevating foot pedal 64. In other words, while preventing the position of the pedal case 50 from being displaced in the longitudinal direction, which is caused by the stepping operation on the lowering foot pedal 62 or the elevating foot pedal 64, it is possible to sufficiently secure a space where the foot Mf that does not step on the foot pedal 62 (or 64) is to be placed on both sides of the pedal case 50 in the longitudinal direction.

Each rolling roller 68 is located closer to the lower table 22 than the center position of the pedal case 50 in the depth direction. For this reason, it is possible to secure more sufficiently a space where the foot Mf that does not step on the foot pedal 62 (or 64) is to be placed on the both sides of the pedal case 50 in the longitudinal direction.

According to the present embodiment, since the pedal case 50 and the like can be brought close to the lower table 22 more sufficiently, the operator M can perform bending while being sufficiently close to the lower table and the die 14. Further, since it is possible to secure more sufficiently a space where the foot Mf that does not step on the foot pedal 62 (or 64) is to be placed on both sides of the pedal case 50 in the longitudinal direction, the operator can perform bending for a long time while maintaining a stable posture. In other words, according to the present embodiment, the workability of the bending can be sufficiently improved while the operator M is maintaining a balance when stepping on the lowering foot pedal 62 or the elevating foot pedal 64.

The pedal case 50 and a side of the main body frame 16 (for example, the lower table 22 or the separate member such as the fixed frame) are coupled only by a configuration via the urging members. For this reason, it is possible to adjust a difference in level between the side of the main body frame 16 and the floor surface F and to absorb an unevenness on the floor surface F. Further, the pedal case 50 is fixed on the side of the main body frame 16 via the urging members. For this reason, a load on the pedal is reduced when the lowering foot pedal 62 or the elevating foot pedal 64 is stepped on.

The present invention has, for example, the following configuration.

The press brake includes a guide member provided at a lower portion of a lower table or provided on a separate member arranged on a front side of the lower table, the guide member extending in a longitudinal direction, a sliding member provided on the guide member so as to be movable in the longitudinal direction, a pedal case having an upper portion coupled to the sliding member so as to be movable and tiltable in a vertical direction, the pedal case extending on a back surface side thereof toward the lower table relative to the sliding member, the pedal case having a grounding portion capable of being grounded on a floor surface, the pedal case being manually movable in the longitudinal direction together with the sliding member, a foot pedal provided inside the pedal case and configured to be stepped on to perform an elevating and lowering operation of an upper table, a rolling body provided on each of side surfaces of the pedal case in the longitudinal direction and configured to roll on the floor surface along the longitudinal direction, and an urging member configured to urge the pedal case with respect to the sliding member so that the grounding portion of the pedal case is separated from the floor surface.

According to the above configuration, the upper portion of the pedal case is coupled to the sliding member so as to be tiltable in the vertical direction, and the pedal case extends on the back surface side thereof toward the lower table relative to the sliding member. For this reason, the pedal case can be brought sufficiently close to the lower table.

Further, according to the above configuration, the upper portion of the pedal case is coupled to the sliding member so as to be movable in the vertical direction. The urging member urges the pedal case with respect to the sliding member so that the grounding portion of the pedal case is separated from the floor surface. Thereby, when the foot pedal is stepped on, the pedal case is tilted downward with the rolling body as a fulcrum while resisting an urging force of the urging member, so that the grounding portion of the pedal case is grounded on the floor surface. For this reason, without providing a cover for covering the rolling body from above on each of side surfaces of the pedal case in the longitudinal direction, and providing a spring inside each cover for urging the rolling body downward with respect to the pedal case, it is possible to prevent a position of the pedal case from being displaced in the longitudinal direction, which is caused by the stepping operation on the foot pedal. In other words, while preventing the position of the pedal case from being displaced in the longitudinal direction, which is caused by the stepping operation on the foot pedal, it is possible to sufficiently secure a space where a foot that does not step on the foot pedal is to be placed on both sides of the pedal case in the longitudinal direction.

According to the above configuration, since the pedal case can be brought sufficiently close to the lower table, the operator can perform bending while being sufficiently close to the lower table and the lower tool. Further, since it is possible to sufficiently secure the space where the foot that does not step on the foot pedal is to be placed on the both sides of the pedal case in the longitudinal direction, the operator can perform the bending for a long time while maintaining a stable posture. In other words, the workability of the bending can be sufficiently improved while the operator is maintaining a balance when stepping on the foot pedal.

The press brake may further include a coupling bracket provided at the upper portion of the pedal case and having an elongated hole extending in the vertical direction, and a fixing member fixed to the sliding member and inserted through the elongated hole of the coupling bracket. In this case, the urging member may be a spring provided on an outer circumference of the fixing member and configured to urge the coupling bracket toward the sliding member.

The press brake may be configured such that when the foot pedal is stepped on, the pedal case is tilted downward with the rolling body as a fulcrum while resisting an urging force of the urging member, so that the grounding portion of the pedal case is grounded on the floor surface.

In the press brake, the rolling body may be located closer to the lower table than a center position of the pedal case in a depth direction.

The press brake may further include an auxiliary rolling body provided on each of the side surfaces of the pedal case in the longitudinal direction, projecting toward the lower table relative to the back surface of the pedal case, and configured to roll on the front surface of the lower table along the longitudinal direction.

Although some embodiments have been described above, each embodiment is merely an example described for facilitating the understanding of the present disclosure. The technical scope of the present disclosure is not limited to the specific technical matters disclosed in the above-described embodiments, but also includes various modifications, changes, alternative technologies, and the like that can be easily derived from the specific technical matters.

The entire contents of Japanese Patent Application No. 2019-078268 (Filing date: Apr. 17, 2019) are incorporated herein by reference.

The invention claimed is:

1. A press brake comprising:

a guide member provided at a lower portion of a lower table or provided on a separate member arranged on a front side of the lower table, the guide member extending in a longitudinal direction;

a sliding member provided on the guide member so as to be movable in the longitudinal direction;

a pedal case having an upper portion coupled to the sliding member so as to be movable and tiltable in a vertical direction, the pedal case extending on a back surface side thereof toward the lower table relative to the sliding member, the pedal case having a grounding portion capable of being grounded on a floor surface, the pedal case being manually movable in the longitudinal direction together with the sliding member;

a foot pedal provided inside the pedal case and configured to be stepped on to perform an elevating and lowering operation of an upper table;

a rolling body provided on each of side surfaces of the pedal case in the longitudinal direction and configured to roll on the floor surface along the longitudinal direction; and an urging member configured to urge the pedal case with respect to the sliding member so that the grounding portion of the pedal case is separated from the floor surface.

2. The press brake according to claim 1, further comprising:

a coupling bracket provided at the upper portion of the pedal case and having an elongated hole extending in the vertical direction; and a fixing member fixed to the sliding member and inserted through the elongated hole of the coupling bracket.

3. The press brake according to claim 2, wherein the urging member is a spring provided on an outer circumference of the fixing member and configured to urge the coupling bracket toward the sliding member.

4. The press brake according to claim 1, wherein when the foot pedal is stepped on, the pedal case is tilted downward with the rolling body as a fulcrum while resisting an urging force of the urging member, so that the grounding portion of the pedal case is grounded on the floor surface.

5. The press brake according to claim 1, wherein the rolling body is located closer to the lower table than a center position of the pedal case in a depth direction.

6. The press brake according to claim 1, further comprising an auxiliary rolling body provided on each of the side surfaces of the pedal case in the longitudinal direction, projecting toward the lower table relative to the back surface of the pedal case, and configured to roll on the front surface of the lower table along the longitudinal direction.

* * * * *